(12) United States Patent
Carson et al.

(10) Patent No.: US 6,807,911 B2
(45) Date of Patent: *Oct. 26, 2004

(54) PALLET WITH STRESS RESISTANT STRUCTURE

(75) Inventors: Craig Carson, Kildeer, IL (US); Mark Bendit, Avon, IN (US); Steven Turley, Plainfield, IN (US)

(73) Assignee: Jeco Plastic Products, LLC, Plainfield, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/144,627

(22) Filed: May 13, 2002

(65) Prior Publication Data

US 2003/0089285 A1 May 15, 2003

(Under 37 CFR 1.47)

Related U.S. Application Data

(63) Continuation-in-part of application No. 09/821,475, filed on Mar. 29, 2001, now Pat. No. 6,386,118.

(51) Int. Cl.[7] .............................................. B65D 15/00
(52) U.S. Cl. ................................... 108/57.28; 108/901
(58) Field of Search ......................... 108/901, 51.11, 108/57.25, 57.28, 57.29, 53.3; 248/346.02; 206/386, 599

(56) References Cited

U.S. PATENT DOCUMENTS

| | | | |
|---|---|---|---|
| 3,187,691 A | 6/1965 | Leitzel | 108/58 |
| 3,228,358 A | 1/1966 | Sepe et al. | 108/58 |
| 3,404,642 A * | 10/1968 | Belcher et al. | 108/57.1 |
| 3,424,110 A | 1/1969 | Toot | 108/53 |
| 3,561,375 A * | 2/1971 | Hammond et al. | 108/53.1 |
| 3,590,751 A * | 7/1971 | Freid et al. | 108/51.3 |
| 3,628,468 A * | 12/1971 | Angelbeck et al. | 108/53.1 |
| 3,736,885 A * | 6/1973 | Freund | 108/57.28 |
| 3,750,598 A | 8/1973 | Campbell et al. | 108/51 |
| 4,000,704 A | 1/1977 | Griffin, Jr. | 108/53.1 |
| 4,029,023 A * | 6/1977 | Rosewicz et al. | 108/57.28 |
| 4,051,787 A | 10/1977 | Nishitani et al. | 108/55.3 |
| 4,159,681 A | 7/1979 | Vandament | 108/51.1 |
| 4,318,351 A | 3/1982 | Munk | 108/53.1 |
| 4,398,653 A * | 8/1983 | Daloisio | 222/143 |
| D276,702 S | 12/1984 | Entenmann et al. | D9/456 |
| 4,706,576 A | 11/1987 | James | 108/111 |
| 4,838,176 A | 6/1989 | Bowser, Sr. et al. | 108/53.3 |
| 5,046,434 A | 9/1991 | Breezer et al. | 108/51.1 |
| 5,058,223 A | 10/1991 | Vasquez | 5/237 |
| 5,092,251 A | 3/1992 | Hamaker et al. | 108/51.1 |
| 5,168,817 A | 12/1992 | Nulle et al. | 108/51.1 |
| 5,205,221 A * | 4/1993 | Melin et al. | 108/51.3 |

(List continued on next page.)

FOREIGN PATENT DOCUMENTS

| | | | |
|---|---|---|---|
| DE | 8911445 | 11/1989 | |
| EP | WO 01/12509 | 2/2001 | 108/53.3 |

OTHER PUBLICATIONS

Stratis Corporation, Stratis Plastic Pallets—4–Way Entry Deck–Lok Stacking System, dated Jun. 5, 1996.

*Primary Examiner*—Janet M. Wilkens
(74) *Attorney, Agent, or Firm*—Barnes & Thornburg; Timothy J. Engling

(57) ABSTRACT

A one-piece, hollow, continuous wall pallet having a deck and underside structural features that function in conjunction with the deck for support and reinforcement when a load is placed on the pallet or when a side of the pallet is impacted. The structural features may include an arched bottom recess, side impact depressions, and kiss-off structures, in one of the legs or portion of the underside. The pallet deck may have a dual entry rib configuration. The pallet is preferably made using rotational molding.

33 Claims, 6 Drawing Sheets

U.S. PATENT DOCUMENTS

| | | | |
|---|---|---|---|
| 5,341,748 A | 8/1994 | Liu | 108/53.3 |
| 5,392,911 A * | 2/1995 | Gillispie et al. | 206/386 |
| 5,408,937 A | 4/1995 | Knight, IV et al. | 108/55.5 |
| 5,419,524 A | 5/1995 | Evans et al. | 248/346 |
| 5,582,113 A | 12/1996 | Langenbeck | 108/51.1 |
| 5,606,921 A * | 3/1997 | Elder et al. | 108/53.3 |
| 5,669,315 A * | 9/1997 | Model | 108/56.3 |
| 5,755,162 A | 5/1998 | Knight et al. | 108/51.1 |
| 5,769,003 A | 6/1998 | Rose et al. | 108/55.3 |
| 5,813,355 A | 9/1998 | Brown et al. | 108/53.3 |
| 5,868,080 A | 2/1999 | Wyler et al. | 108/57.25 |
| D423,752 S | 4/2000 | Elder | D34/38 |
| 6,079,339 A | 6/2000 | Houk, Jr. et al. | 108/186 |
| 6,123,032 A | 9/2000 | Ohanesian | 108/57.26 |
| D433,208 S | 10/2000 | Elder | D34/38 |
| 6,180,203 B1 | 1/2001 | Unkles | 428/71 |
| 6,209,464 B1 | 4/2001 | Elder | 108/53.3 |
| 6,357,366 B1 * | 3/2002 | Frankenberg | 108/57.25 |

* cited by examiner

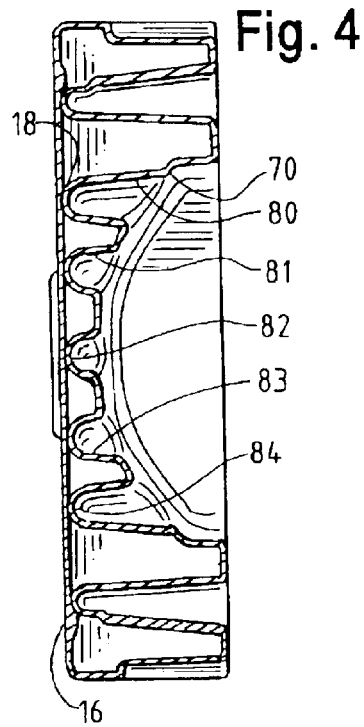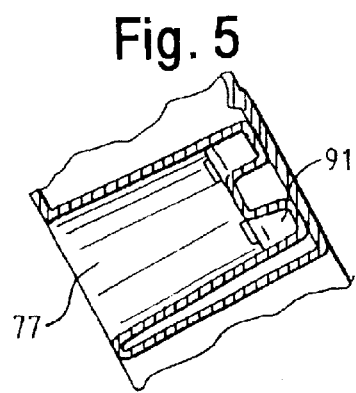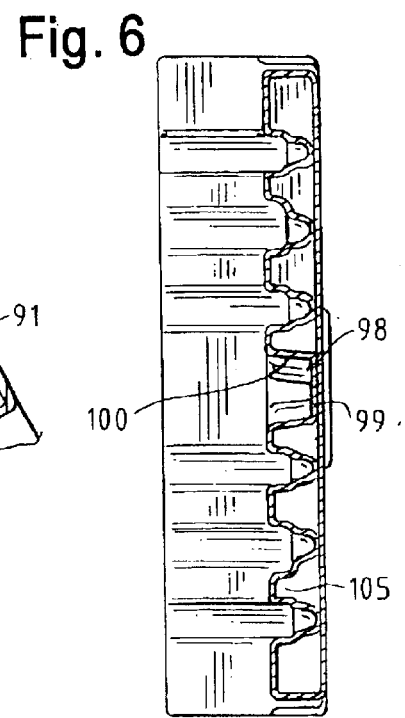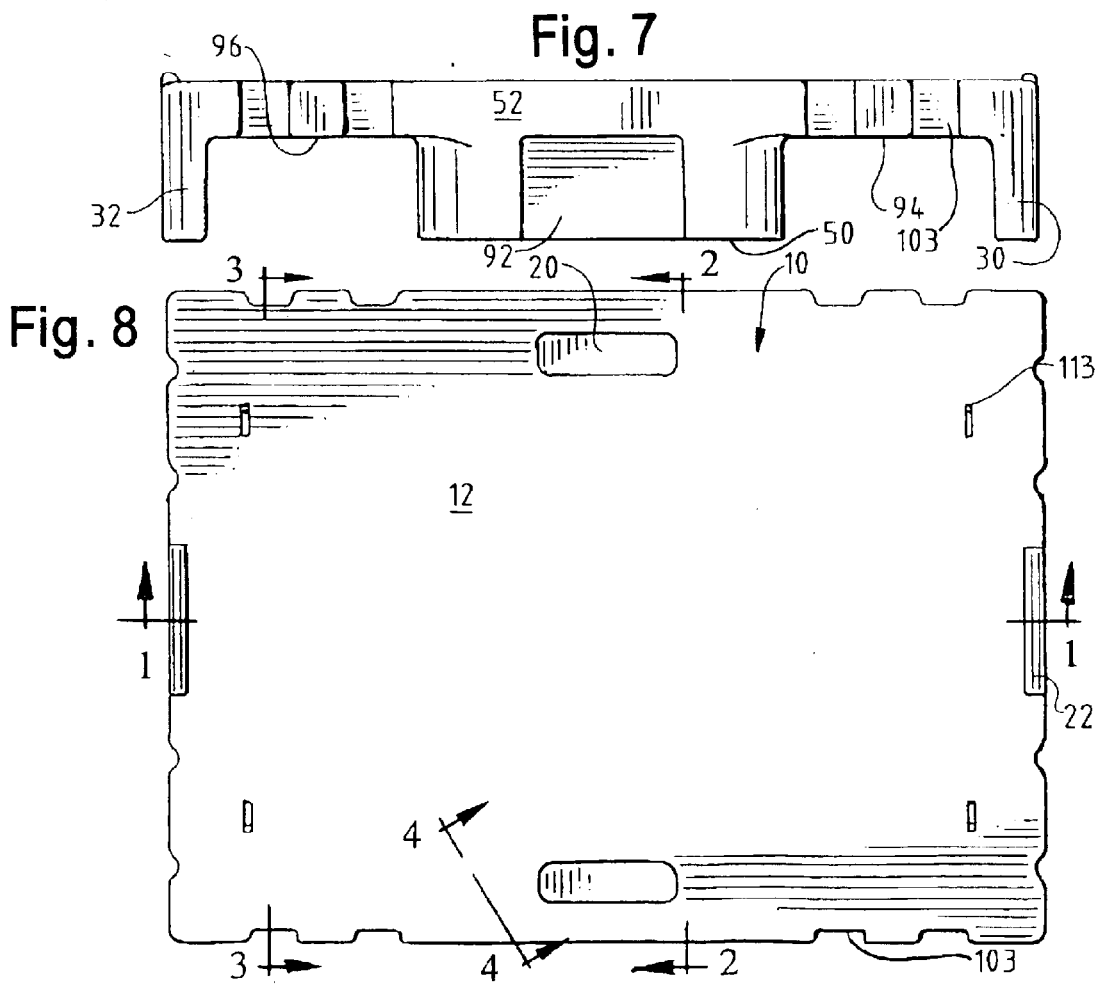

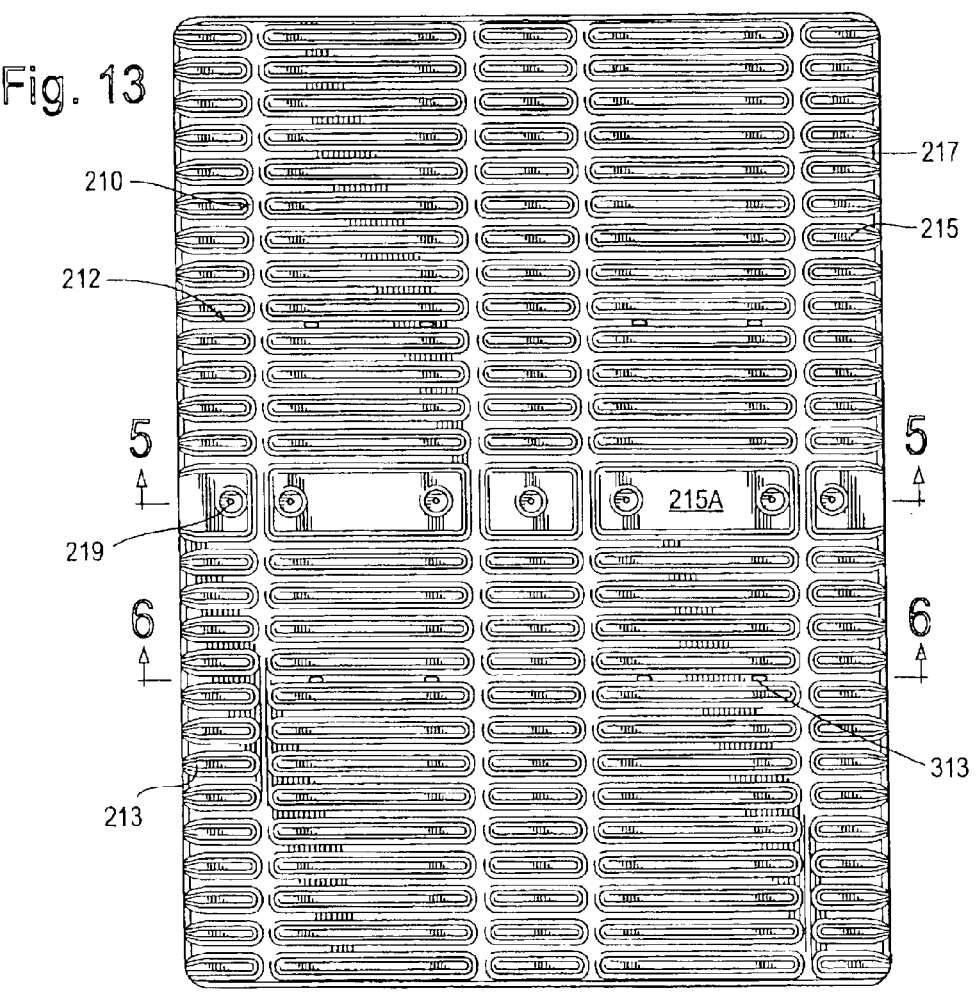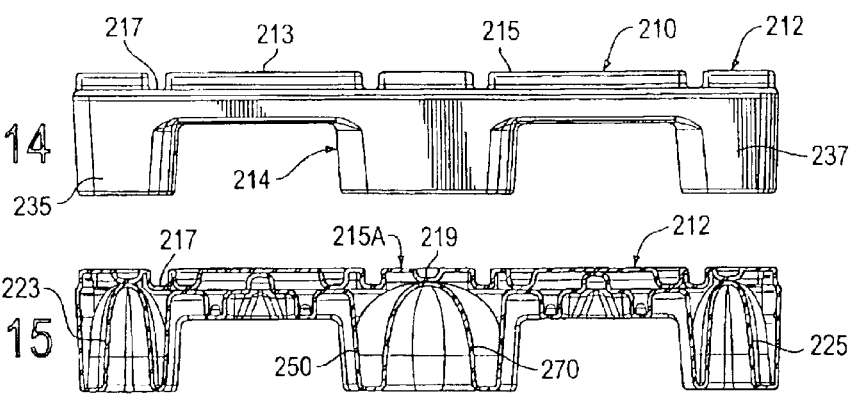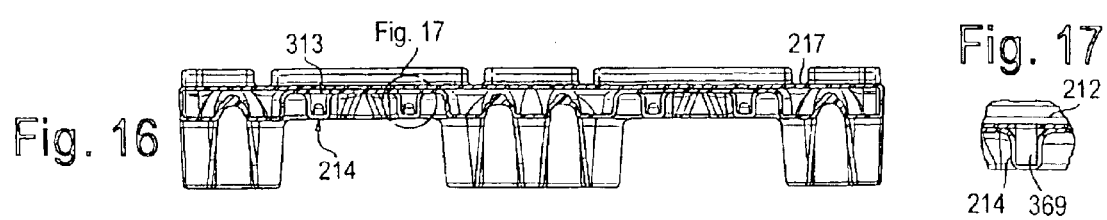

PALLET WITH STRESS RESISTANT STRUCTURE

RELATED APPLICATION DATA

This application is a continuation-in-part of application Ser. No. 09/821,475, filed Mar. 29, 2001 now U.S. Pat. No. 6,386,118.

BACKGROUND OF THE INVENTION

The present invention relates to a plastic pallet. More specifically, the invention is directed toward a continuous surface, hollow pallet having a deck and underside structural features that function in conjunction with the deck for support and reinforcement when a load is placed on the pallet or when a side of the pallet is impacted. The pallet deck may have a dual entry rib configuration.

Plastic pallets are strong, durable, lightweight and versatile. Also, they are economical and substantially maintenance free. Various types of plastic and resins are acceptable to use in manufacturing pallets. The present pallet can be a rotationally molded plastic pallet. Rotationally molded polyethylene (PE) has been proven to be a good material for plastic pallets. Pallet molds for rotational molding are used in manufacturing such pallets. Molding equipment is often computer controlled, including time and temperature, for the highest quality pallets.

Rotational molding (also known as rotomolding) allows for hollow, one-piece, unitary construction that can be completely enclosed with a continuous and seamless surface. Rotomolding also provides uniform wall thicknesses and lacks the problematic thinning in the extremities of the pallet found in other processes. Further, it allows for a pallet that is resistant to stress-cracking and corrosion. Low levels of mold-in stress improve the impact strength of the pallet. Finally, rotational molding provides excellent load-bearing properties.

Products produced by rotational molding are generally characterized as having good strength and structural integrity, abrasion resistance, weather resistance including ultraviolet (UV) stability, wide color range, selectable surface finish from high gloss to matte and textured, chemical resistance and environmental stress crack resistance.

Typical plastics employed in rotational molding processes are the polyolefins, including the preferred PE and polypropylene (PP), polyvinyl-chloride (PVC), and polycarbonates, as well as nylon. Other materials that may be used in rotational molding or in combination with other materials include fluoropolymers, polycarbonates, cellulose, acetate butyrate, elastomers, polyurethane, and EVA. Many plastic resins are suitable for use in rotational molding, including copolymeric materials and mixtures of other resins.

The pallet may be used for many purposes including as continuous feed pallets for printing presses while still being versatile to be used by customers of commercial printing and converting industries.

The Unkles U.S. Pat. No. 6,180,203 discloses a specific method of using recycled materials for rotational molding of articles, including pallets. The patent shows an embodiment of a shipping pallet manufactured in accordance with that invention. The pallet has a deck 18 with end rails 19 and a central support rail 20. The central rail provides additional support for the deck thereby resulting in an improved load carrying capacity. The disclosed pallet lacks the underside structural features of the present pallet.

The Ohanesian U.S. Pat. No. 6,123,032 discloses a thermoplastic pallet with strengthening ridges and channels in the load-bearing surface. The patent suggests that this pallet may have corresponding structures in the opposing surface and does not have a substantially flat load-bearing surface. The legs are formed in a shape somewhat similar to the floral kiss-off structures of the present invention, but they are used to accommodate legs, not to support the deck. While the Ohanesian legs may initially look similar to floral kiss-off structures, the tapered leg holes have an identical internal and external structure. The floral kiss-off structures are for a different purpose than interlocking pallets. They resist load and stresses on a hollow pallet and have a corresponding deck. The Ohanesian pallet is formed from a single rigid sheet of thermoplastic material, and is not hollow like a rotationally molded pallet.

Another pallet is shown in Campbell U.S. Pat. No. 3,750,598, which shows an impact absorbing corner structure for a pallet. This is a lattice wall construction having corners that transfer loads along the individual chords. This is distinct from the present pallet, which has continuous walls that bend into other walls, legs, recesses etc. The corner of Campbell shows a three-sided structure formed by the lattice wall. The "corner" or rounded vertex of the angular impact depression of the present pallet is adjacent the outer side, rather than inward on a corner, in order to transfer loads by directing them away from the point of impact. It is a fundamentally different way of distributing side loads. The square structures do not recover their shape because of the design, but because of the resilient nature of the material itself. A square has no inherent self-reforming characteristics, particularly with HDPE (high density PE), which shatters when struck.

OBJECT OF THE INVENTION

An object of the present invention is to provide a pallet that is strong, durable, lightweight and versatile. It is a further object of the invention to provide a hollow plastic pallet having a deck and underside structural features that function in conjunction with the deck for support and reinforcement when a load is placed on the pallet.

It is also an object of the invention to provide a pallet with structural features that provide support and resistance to stress, pressure and impact.

Further, it is another intention of the invention to provide a pallet adapted for many uses.

It has therefore been found beneficial to produce an improved pallet with an arched bottom recess, side impact depressions, and kiss-off structures.

SUMMARY OF THE INVENTION

The present invention overcomes certain impact resistance and load-bearing capacity limitations of plastic pallets. The pallet provides stress resistance based on the structure of the pallet though association between the deck and the underside. It is specifically contemplated that underside structural features provide maximum load-bearing capacity. The present invention provides structural integrity and strength for pallets with thinner wall thickness that are produced by rotational molding.

Although rotational molding is preferred, other molding processes can form two plastic members. The members may include a pair of spaced outer surfaces and inner surfaces that are combined to form a continuous pallet. The structure using a wall of the underside member to support the deck member as described herein can be adapted for manufacturing methods other than the preferred rotational molding process.

In a preferred embodiment, the invention may be described as a thin wall pallet with a continuous surface. The structure minimizes sharp corners in any of the inward structures of the pallet. The pallet ideally is one-piece, hollow, continuous wall, strong, durable, and lightweight.

The pallet may include an arched bottom recess that is a portion of the underside member of the pallet, preferably in a center leg. The arched bottom recess in the center leg is a structural feature designed to maximize the load-bearing capacity of the pallet. The arched bottom recess arches concave toward the deck. The arched bottom recess is preferably arcuate in both directions from both opposing sides of the center leg to a deepest point in the center of the recess so that a downward load on the surface of the pallet is transferred outwardly. The arch transfers loads and preferably includes kiss-off depressions to simultaneously provide vertical strength. The inner surface of the arch may be spaced to not directly contact the inner surface of the deck, but may have numerous depressions extending upward to contact the inner surface of the deck when a load is placed on the deck. The arched recess preferably does not extend from one end of the center leg to the other side.

It is contemplated that the pallet may also include substantially triangular side impact depressions, which again may be incorporated into the center leg. Also, diamond kiss-offs and other substantially V-shaped rounded vertex structures can serve as side impact depressions on the outer side of a leg. The angular shaped side impact depressions have a rounded corner adjacent the outer side wall of the pallet or leg. This configuration is designed to resist side impact forces when side impact is dissipated throughout the side and the depression. Also, angular shaped depressions may provide internal reinforcement to the deck, and triangular depressions in the same leg may reinforce other adjacent triangular depressions.

The pallet additionally provides for floral kiss-off structures. The floral kiss-off structures are also designed to prevent damage to the pallet by resisting horizontal loads on the pallet. The floral kiss-off in appropriate locations resists outward pressure. The internal floral structure normally is in contact with an opposing substantially flat surface on the deck so stresses on the load-bearing surface of the deck are directed down and out through the floral kiss-off structure.

The kiss-offs and angular depressions can be formed by using rotational molding, but are not readily feasible to mold in injection molding. The unique structure of these elements may be formed using other processes, such as thermoforming, if two elements of a pallet are separately formed and fixed together. But methods other than rotational molding are disfavored.

Also, the arched bottom recess and the angular side impact depressions may have a concave depression extending toward the load-bearing surface. The floral kiss-off structure in some instances may also have such depressions. The arched bottom recess, the angular side impact depressions, concave depressions, and the floral kiss-off structure are preferably free of flat surfaces, right angles, sharp edges, and corners. Certain wall sections preferably curve and bend forming concave depressions that are part of a continuous wall.

The outer legs of the pallet are on the outermost portion of opposing sides of the pallet. This provides maximum load stability for the pallet. Legs on the outermost sides of the pallet make it difficult for the pallet to tip. The outer legs are preferably used in conjunction with a center leg that prevents the center of the pallet from collapsing. The center leg provides additional support for the deck thereby resulting in an improved load carrying capacity.

The deck may have optional nubbins extending above the load-bearing surface to act as a deck lock. The nubbins that rise above the load-bearing surface preferably do so above the outer legs. The outer legs would have corresponding recesses to accommodate nubbins of another pallet. Nubbins are preferably along the rounded edge to assist in stacking or identifying the rounded edge for use in certain processes using a pallet. The nubbins, especially extending the entire length of a rounded edge, may be used for load containment.

An optional feature in the pallet deck improves on single entry ribs. In FIGS. 11 and 13, a pallet is shown with a dual entry rib configuration. Several features differentiate the dual entry ribbed top from other designs. First, a pallet with ribs running in both directions can accommodate dual entry for automatic swords on printing presses in both the lateral or longitudinal directions. The channels between the ribs extend completely across the deck in both the lateral or longitudinal directions. This may be particularly important for laminators. Second, a wide middle rib has "dimples" in it that gives additional support to the pallet deck. Third, the outer ribs are also wide so that the items placed on the pallet, such as paper stock, will always rest on a rib and not in a channel. Finally, the pallet can optionally have removable inserts for a tool that will remove the wide outer ribs completely to allow for machine clearance on presses that were not designed for the full 104 cm format.

Finally, a preferred pallet may have recesses or cavities to accommodate L-shaped brackets or similar reinforcement bars. These recesses may also have a concave depression extending toward the load-bearing surface. Brackets can reinforce the pallet. The brackets preferably extend in the recesses from the bottom surface to the center portion. Rotational molding also allows for metal inserts as integral parts of the pallet.

BRIEF DESCRIPTION OF THE DRAWINGS

The above mentioned and other features of this invention and the manner of obtaining them will become more apparent and the invention itself will be best understood by reference to the following description of embodiments of the invention taken in conjunction with the accompanying drawing in which:

FIG. 4 shows a cross sectional view through the center leg of the pallet along section 2—2 of FIG. 8;

FIG. 5 illustrates a cross section of a triangular shaped impact depression along section 4—4 of FIG. 8;

FIG. 6 shows a cross sectional view though a partially planar section and kiss-off structure of the pallet along section 3—3 of FIG. 8;

FIG. 7 illustrates an outer side of the pallet;

FIG. 8 shows a top view of a pallet;

FIG. 13 shows a top view of the ribbed pallet;

FIG. 14 shows a lateral side view of the ribbed pallet;

FIG. 15 shows a cross sectional view through the center of the ribbed pallet along section 5—5 of FIG. 13;

FIG. 16 shows a cross sectional view through a channel including a clamp of the ribbed pallet along section 6—6 of FIG. 13;

FIG. 17 shows a detail of an insertable metal bar;

DETAILED DESCRIPTION OF THE INVENTION

Figure 1:
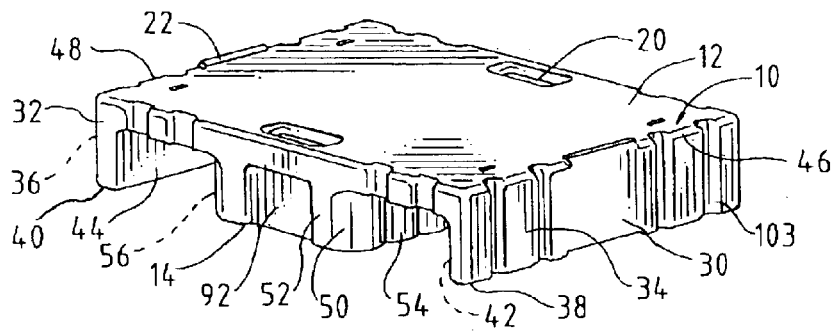
FIG. 1 shows a perspective view of a preferred embodiment of a pallet of the present invention.

In the Figures, like reference numerals indicate the same elements throughout, and the same last two numbers in a reference numeral indicates the same or an equivalent element, except 213. FIG. 1 shows a pallet 10. The pallet 10 can be made of a variety of materials. Ideally, the pallet 10 is made of rotationally molded plastic. The construction is preferably a linear low-density PE (LLDPE). The wall thickness can vary as needed, but with LLDPE, a wall thickness of 4.75 mm (0.19 inch) has proven acceptable for use with a pallet. At this thickness, a uniform wall thickness has an acceptable tolerance of 0.010 inch per inch. Other plastics employed in rotational molding processes are the polyolefins, including the preferred PE and polypropylene (PP), polyvinyl-chloride (PVC), polycarbonates, and nylon. These plastics can be used with a variety of resins and additives to meet particular needs or desires.

Figure 2:
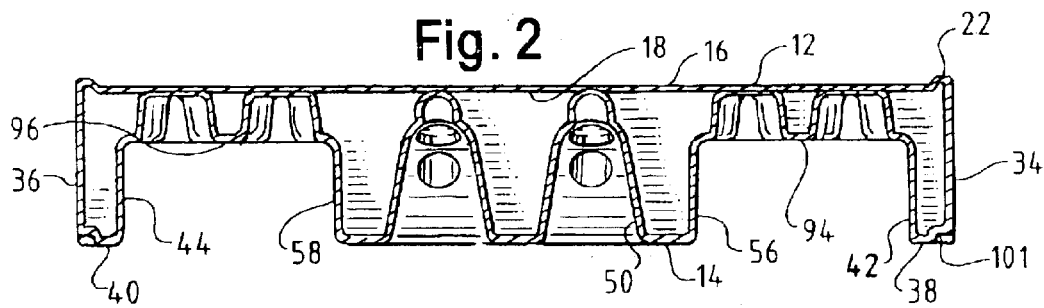
FIG. 2 shows a cross sectional view of the pallet across three legs along section 1—1 of FIG. 8.

In greater detail, with reference first directed to FIGS. 1 and 2, a pallet 10 is illustrated with a deck 12 and an underside 14. The walls of the pallet 10 have an outer surface 16 (i.e., the load-bearing surface on the deck 12) and an inner surface 18. The deck 12 and the underside 14 are preferably constructed of a unitary, continuous wall that bends, arches, or curves along all edges and structural features. Portions of the inner surface 18 of the underside 14 extend toward the inner surface 18 of the deck 12 to provide structural support to the deck 12 when a load stresses the deck 12 as more fully detailed below. There are no lattice walls or other open framework abutting the deck to provide support.

The deck 12 is preferably substantially flat. Although possible, the deck is not intended to be prestressed in an upwardly bent manner. The deck 12 may include hand holds 20 and a nubbin 22 or other raised portion. The load-bearing outer surface 16 of the deck 12 may have a smooth top for general use and may be ribbed for use with a continuous feed press. As defined herein, "substantially flat" could include hand holds 20, nubbins 22, a slight upward bend, or ribbing.

The underside 14 may include two outer legs 30 and 32. Each leg 30 and 32 includes a side wall portion 34 and 36 respectively and a bottom portion 38 and 40 respectively and an inner wall 42 and 44 respectively. The bottom portions 38 and 40 are adapted to contact the ground or floor when the pallet 10 is upright.

Each leg 30 and 32 is preferably extended to the farthest edges 46 and 48 of the deck 12 respectively. Thus, the legs 30 and 32 are designed for maximum load and pallet stability.

The underside 14 preferably also includes a center leg 50. Ideally, the center leg 50 is equidistant between and parallel to the two outer legs 30 and 32. The center leg 50 includes two side wall portions 52 and 54. The center leg 50 also has inside walls 56 and 58 as part of the underside 14. The center leg 50 is in a bottom plane, of which a portion is adapted to contact the ground or floor when the pallet 10 is upright.

Figure 3:
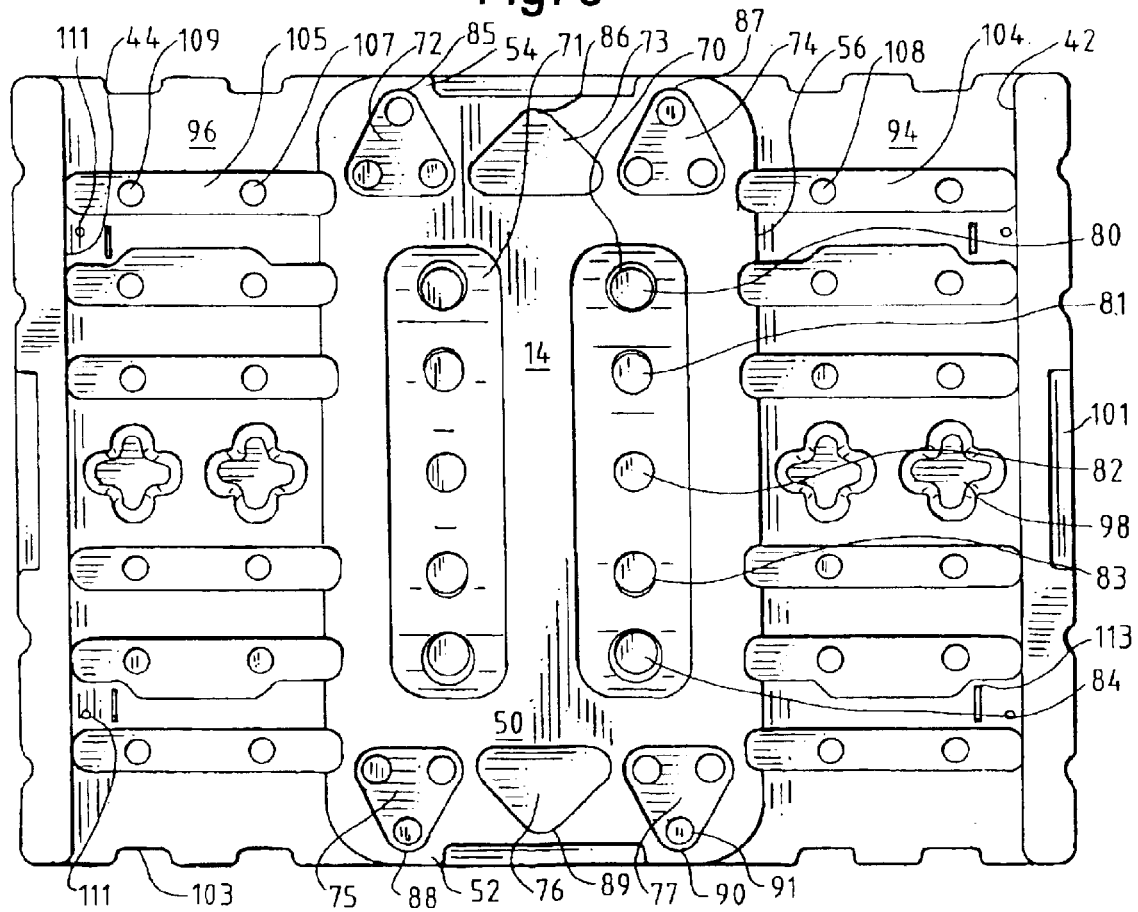
FIG. 3 illustrates the bottom view of the pallet.

The underside 14 includes structural features to maximize the load-bearing capacity of the pallet 10. As best seen in FIG. 3, those features in the center leg 50 include a concave arched bottom recess 70 and a triangular depression 72 that is a portion of the underside member of the pallet 10. Two arched bottom recesses 70 and 71 and a series of triangular depressions 72, 73, 74, 75, 76, and 77 are preferred, as shown in FIG. 3. One recess 70 is shown in cross section in FIG. 4.

The arched bottom recess 70 in the center leg 50 is a structural feature designed to maximize the load-bearing capacity of the pallet 10. As shown, the recess 70 preferably includes at least ten percent of the area of the bottom of the leg. The arched bottom recess is concave in the center portion of the underside 14. The arched bottom recess 70 arches toward the deck 12 and inwardly from the bottom plane. The arched bottom recess 70 is arcuate in both directions so that a downward load on the load-bearing surface 16 of the deck 12 is transferred downwardly and outwardly. When arcuate in both directions from both opposing sides of the center leg, bottom recess 70 will be at a deepest point in the center of the depression, such as 82. The arched recess 70 transfers loads and preferably includes kiss-off depressions 80, 81, 82, 83 and 84 to simultaneously give the pallet vertical strength. The arched recess 70 may, but preferably does not, directly contact the inner surface 18 of the deck 12, rather recess 70 has numerous kiss-off depressions 80–84 extending to contact the deck inner surface 18 as shown in FIGS. 2 and 4. The inner surface 18 of each preferred depression 80–84 is in close proximity or in contact with the inner surface 18 of the deck 12 so a load on the deck 12 is transferred to each depression 80–84. The depressions 80 and 84 that are closest to the side walls 52 and 54 extend farther inward from the arched recess 70 to contact the inner surface 18 of the deck 12 because the arched recess 70 is closer to the bottom plane at that point. Preferably, there is a gap between each adjacent depression 80–84. The arched recess 70 preferably does not extend from one side wall 52 of the center leg 50 to the opposing side wall 54.

Preferably, the pallet 10 will include substantially triangular side impact depressions 72–77, which again may be incorporated in the center leg 50 between the arched recess 70 and each side wall 52 and 54. The triangular shaped side impact depressions 72–77 each have a rounded corner 85–90 respectively adjacent the inner surface 18 of the side walls 52 and 54 of the pallet 10. Triangular is meant to be interpreted broadly to include the preferred rounded corners and any three sided shape, such as a tear drop where one side is completely rounded, but a rounded corner 85–90 is still adjacent the inner surface 18 of the side walls 52 and 54. With a series of triangular shaped depressions 72–74 and 75–77, it is preferred that a portion of adjacent depressions is in contact with adjacent corners. For example, for depressions 73 and 76, the two corners each that do not contact the side wall (52 and 54 respectively) contact the adjacent corners of the other triangular depressions in the series 72 and 74, and 75 and 77 respectively. Depressions 73 and 76, as shown in FIG. 3, are shorter to accommodate a recessed area 92, but corners 86 and 89 are in contact with the side walls 52 and 54, and the distal corners are aligned with the adjacent corners of the other triangular depressions in the series 72 and 74, and 75 and 77 respectively. Depressions 73 and 76 may not have additional kiss-off depressions if they may contact the inner surface 18 of the hand hold 20. Triangular shaped side impact depressions 72, 74, 75 and 77 show three optional kiss-off depressions (i.e., 91) in each extending to and contacting the inner surface of the deck 12. It is to be understood that depressions 72, 74, 75 and 77 may extend to have an inner surface in contact with the inner surface of the deck 12. But an example of a kiss-off depression 91 can be seen in triangular shaped side impact depression 77 per FIGS. 3 and 5. As best seen, in FIG. 5 through section 4—4, the kiss-off depressions (i.e., 91) assist with distributing both vertical and horizontal stresses.

The impact depressions 72–77 are designed to resist side impact in that any force or side impact is dissipated throughout the side walls 52 and 54 and into the rounded corners 85–90 of the impact depressions 72–77. Also, a triangular shape depression may provide internal reinforcement to the deck 12 and other adjacent triangular depressions when the wall sections abut.

Also, on the underside 14 between the three preferred substantially parallel legs 30 and 50 as well as 32 and 50 are two partially planar sections 94 and 96 as seen in FIGS. 2 and 3. Preferably, the inner walls 42 and 44 and the side wall portions 56 and 58 of the center leg 50 and planar section 94 and 96 respectively form a pair of spaced openings for machinery such as pallet feeding equipment or the fork tines of a fork lift.

The pallet 10 additionally may have a floral kiss-off structure 98 as shown in FIGS. 3 and 6 (in cross section) with the preferred two such structures 98 on each planar section 94 and 96 extending inwardly toward the deck 12. The floral kiss-off structure 98 has a substantial portion of its area (in a parallel cross section with the pallet) in contact 99 with the inner surface 18 of the deck 12. The floral kiss-off structure 98 preferably does not have additional depressions like the arched bottom recess 70 and the triangular shaped depressions 72, 74, 75, and 77. The walls 100 of floral kiss-off structure 98 are preferably slightly tapered inwardly toward the deck contact area 99, and all corners are preferably rounded. The floral kiss-off structures 98 are also designed to prevent damage to the pallet 10. The primary function is to resist horizontal loads and stresses on the pallet 10. The floral kiss-off structure 98 in appropriate locations resists outward pressure from a load either from the weight on the pallet or from being lifted, such as by forklift tines. The pallet 10 with a floral structure 98 normally has contact at the deck contact area 99 with an opposing inner smooth surface 18 on the deck so stress on the load-bearing surface 16 is directed down and out through the floral kiss-off structure 98.

Figure 9:
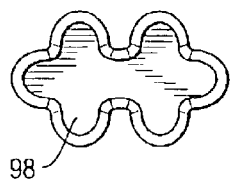
FIG. 9 shows an alternate embodiment of a floral kiss-off structure.

Although the preferred embodiment of the floral kiss-off structure 98 is illustrated and described in connection with a depression having four lobes or petals, it can be adapted for use with a variety of geometric shapes including a floral pattern with six lobes or petals as shown in FIG. 9.

The pallet may include optional features that provide additional benefits. The hand hold 20 may extend below the deck 12 to provide a means for handling the pallet 10. Also, nubbins 22 may extend above the deck 12. The nubbins 22 may provide a variety of functions, such as locking the deck. The nubbins 22 preferably extend above the load-bearing surface of the deck 12 and preferably do so above the outer legs 30 and 32. The legs 30 and 32 would have a corresponding recess 101 (as shown in FIGS. 2 and 3) to accommodate a nubbin 22 of another pallet. In certain applications, the nubbins 22 may be called a stacking lip. Nubbins 22 are preferably along the rounded edges 46 and 48 to assist in stacking or identifying the rounded edge for use in certain processes using a pallet. The nubbins 22, especially extending the entire length of a rounded edge, may be used for load containment.

Recessed area 92 is optional as shown in side wall 52 per FIG. 1 for a variety of uses. This may be fortified against impact by triangular depression 76. The recessed area 92 may be used for a label, tag, or thick insert for bar coding, identification, or logos. The label, tag, or thick insert can be as deep as the recess or very thin so that it will not extend beyond the side wall 52.

Also, a pallet 10 may include banding slots 103 along the edges of the deck 12. Banding slots 103 facilitate bands surrounding the goods on the pallet 10. The banding slot 103 preferably has another corresponding banding slot at the opposite edge of the pallet 10.

Additionally, the pallet 10 may have cavities 104 and 105 adapted to accommodate reinforcement bars, such as steel bars. Preferably, steel bar cavities 104 and 105 are on the underside 14 of the pallet 10 extending in the two partially planar sections 94 and 96 and the side wall portions 56 and 58 of the center leg 50. A steel bar would be L-shaped when used in cavities 104 and 105 extending from the planar sections 94 and 96 to the side wall portions 56 and 58. The steel bar cavities 104 and 105 could have kiss-off depressions 106 and 107 to simultaneously give the cavities 104 and 105 strength and would help add support to the deck 12 when a load is applied on the deck 12. Alternately, the portion of the cavities 104 and 105 adjacent the deck 12 could extend immediately adjacent the deck 12 so that a bar in the cavities 104 and 105 could reinforce the deck 12. A capture area 109 could be formed in or through planar sections 94 or 96. Also, a reinforcing steel bar may extend across the entire underside 14 of the pallet 10. In this case, a reinforcing steel bar may be adjacent the inner wall 42 extend into cavity 104 in the planar section 94 and up the wall portion 56 then across a recess in the bottom plane into the cavity 105 at wall portion 58 bending into the planar section 96 and up the inner wall 44. In a preferred embodiment, a reinforcement bar could extend across the entire underside 14, but a shorter bar may be acceptable. Ideally, for a reinforcement bar that extends across the entire underside 14 or in each spaced opening, the underside could include end pins 111, preferably on a capture area 109. Also, four bar clamping locators, i.e., 113 can be used to accommodate bars.

Figure 10:
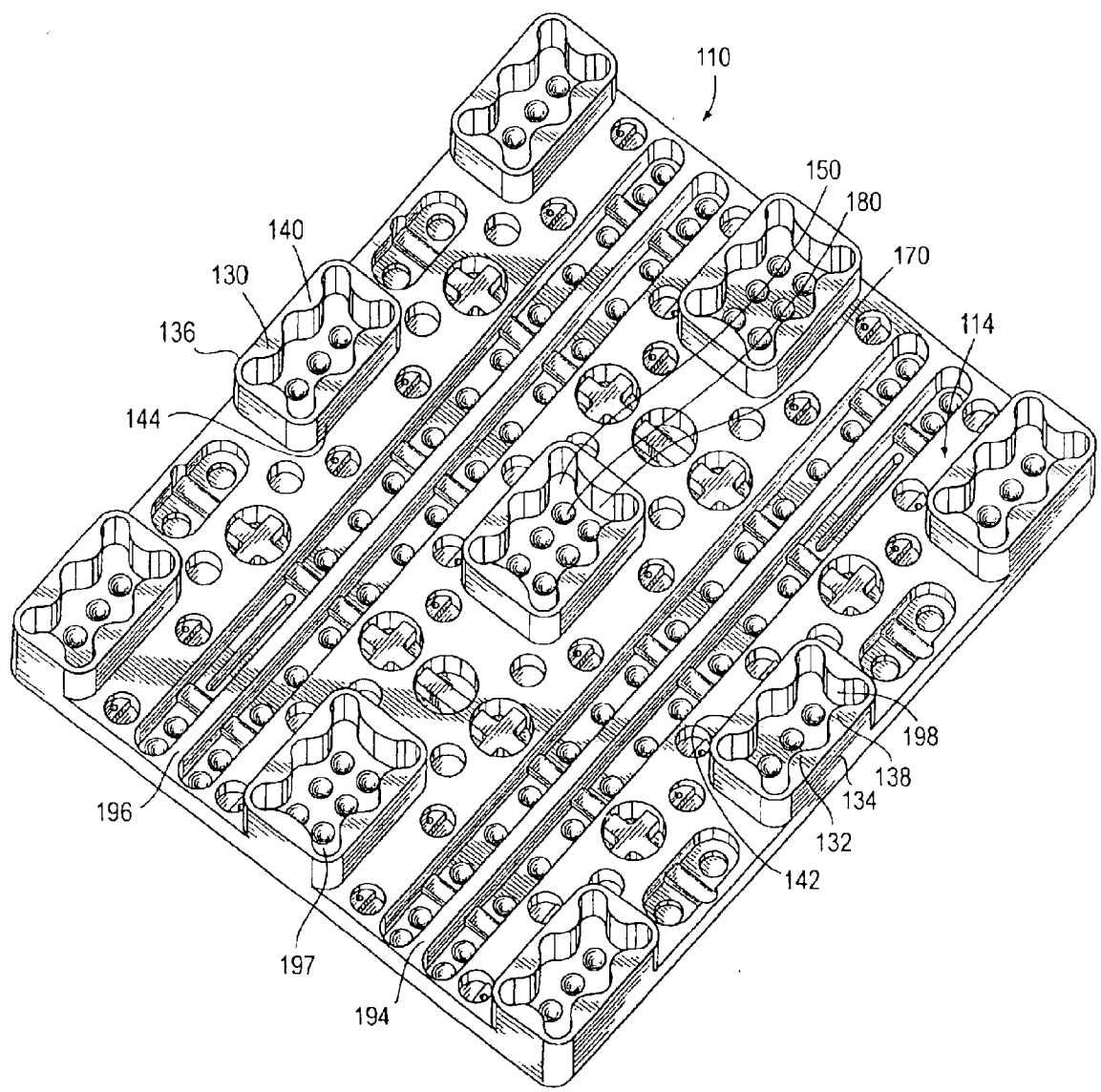
FIG. 10 shows an alternate underside of a pallet with a floral kiss-off structure in each leg.
Figure 11:
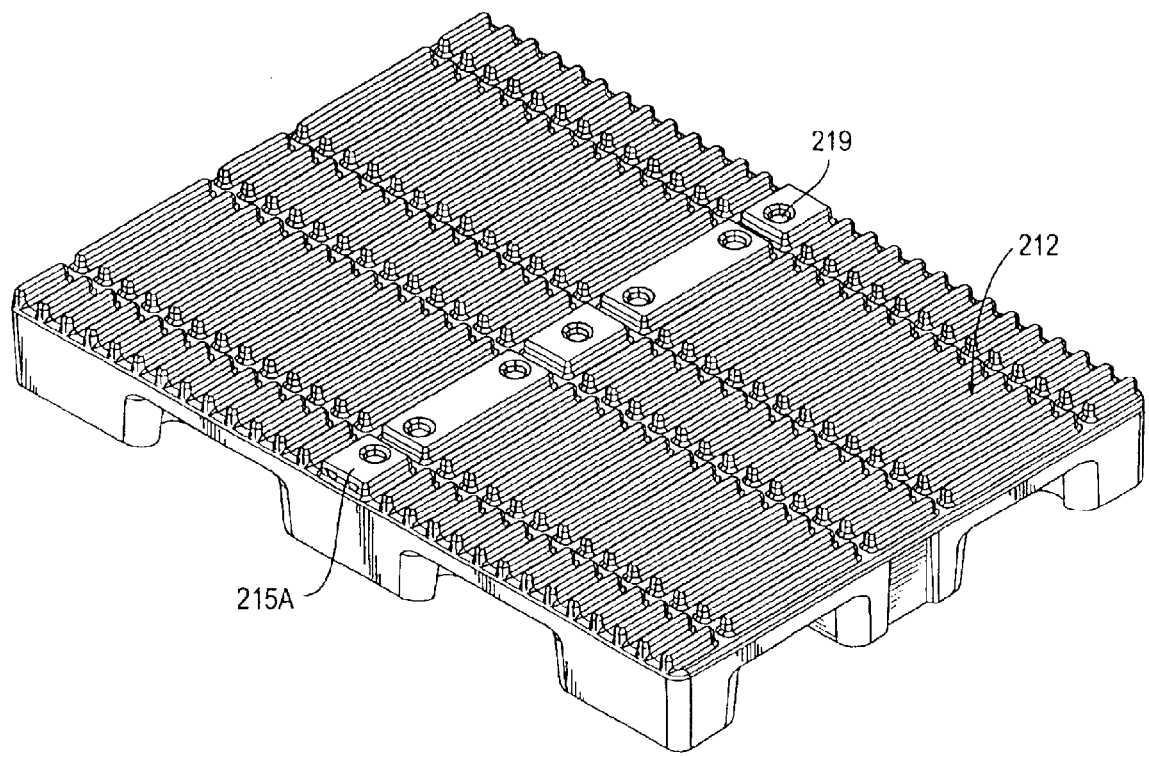
FIG. 11 shows a perspective view of a ribbed embodiment of a pallet of the present invention.
Figure 12:
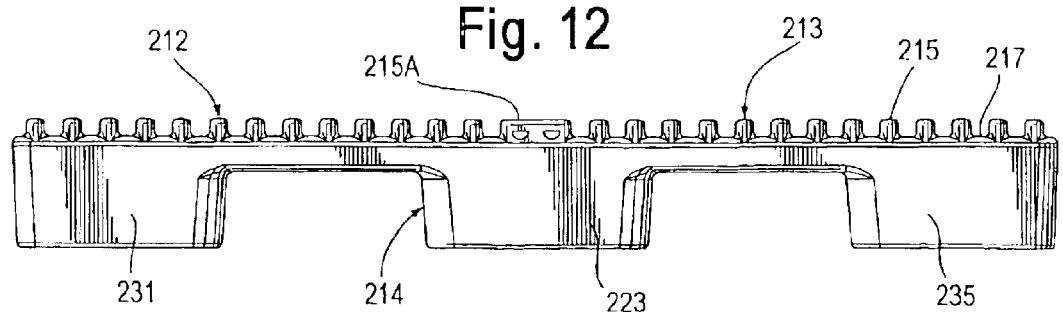
FIG. 12 shows a longitudinal side view of a ribbed pallet.

Other embodiments show modifications on the themes that underside structural features can function in conjunction with the deck for support and that angular side impact structures can resist side impact forces when side impact is dissipated throughout the side and the structure. FIG. 10 shows the underside 114 of a pallet 110 having nine legs, such as 130, 132 & 150. The nine-legged pallet 110 has two pair of spaced openings for machinery such as pallet feeding equipment or the fork tines of a fork lift, so that fork lift tines can slide under the pallet from all four sides of the pallet 110 on planar sections 194 and 196. The pallet 110 has a center leg 150 including a concave arched bottom recess 170 that arches toward the deck wall (not shown). The recess 170 is shown with optional kiss-off depression 180. The center leg 150 does not extend from one side of the pallet 110 to the other when there are nine legs. Although the side wall portions as the outer most part of the pallet are not part of center leg 150, impact resistance remains important for all side walls of all nine legs, such as 130, 132 & 150. All of the nine legs are shown with a floral kiss off structure 198 as part of the leg, such as 130, 132 & 150. The inwardly inclined recess forms an arched recess in the floral kiss off structure 198. The six lobes 197 (as shown) provide resistance to impact on the nine legs, such as 130, 132 & 150, on their side walls.

Figure 18:
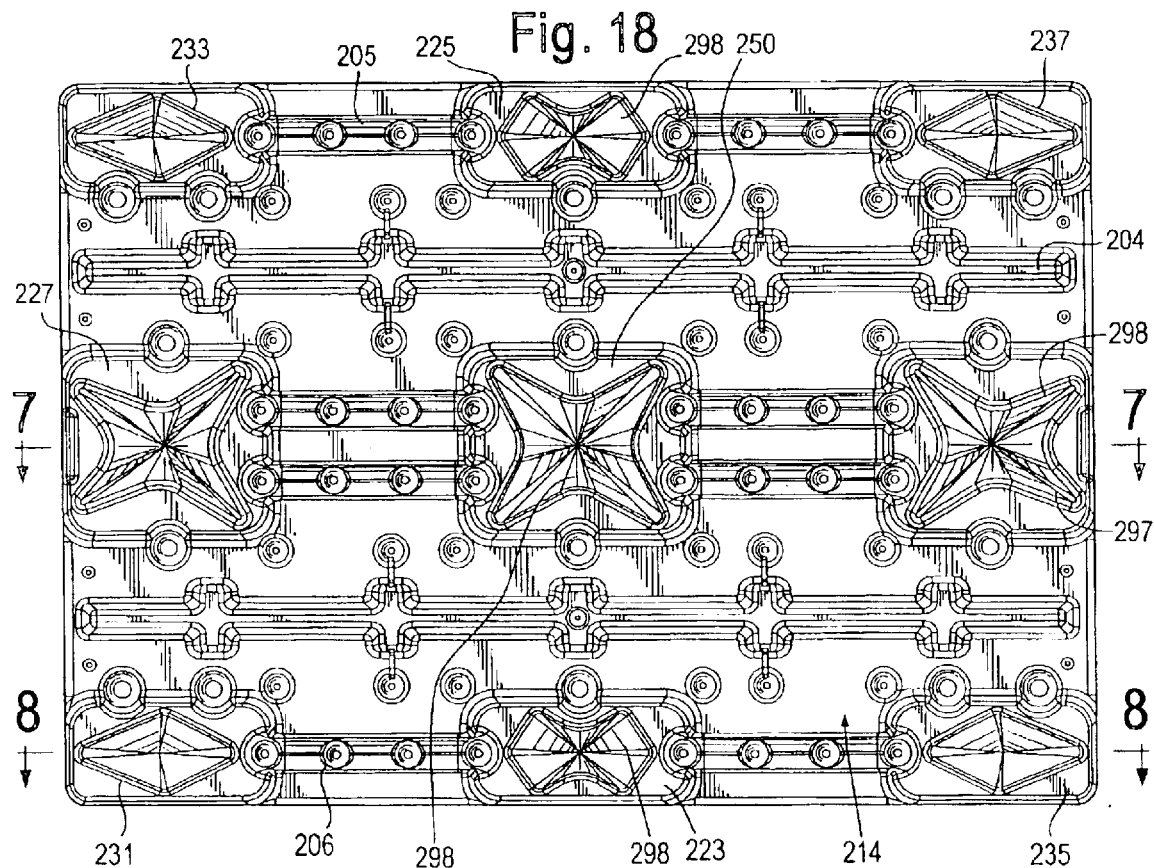
FIG. 18 illustrates the underside of a pallet as an example of the ribbed pallet of FIG. 11.
Figure 19:
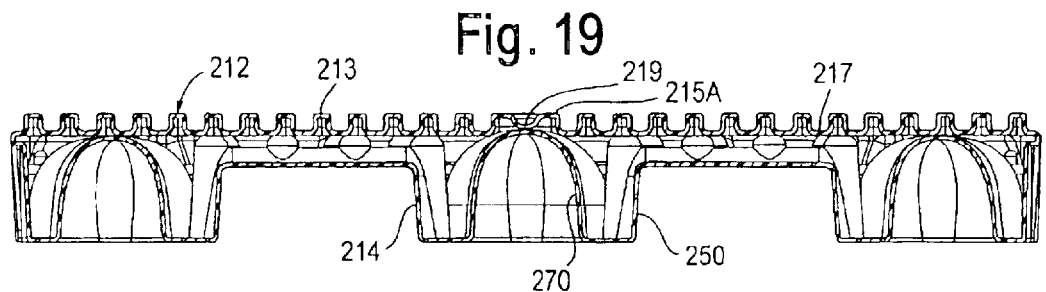
FIG. 19 shows a cross sectional view through the center of the ribbed pallet along section 7—7 of FIG. 18.
Figure 20:
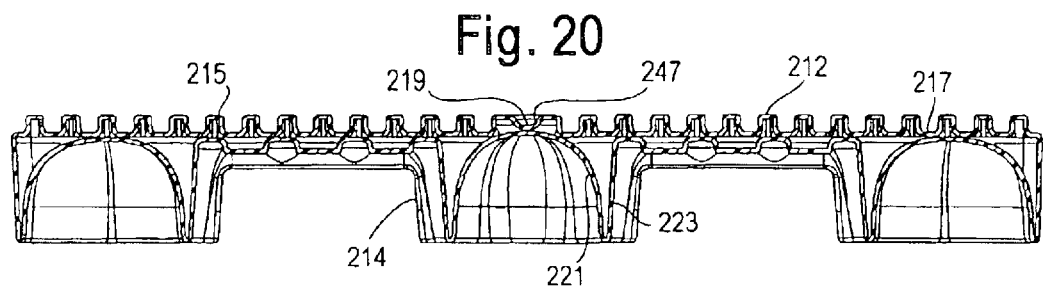
FIG. 20 shows a cross sectional view through three legs of the ribbed pallet along section 7—7 of FIG. 18.

FIGS. 11–20 show an optional ribbed pallet 210 wherein the deck 212 has a dual entry rib configuration. The substantially flat deck 212 is shown with ribbing 213 having ribs 215 and channels 217. The channels 217 preferably extend completely across the deck 212 in both the lateral or longitudinal directions. A portion of the underside 214 is in contact with the channels 217 to provide support to the deck 212. The portion may be either an inwardly inclined center structure in a leg or a depression in the planar portion between the legs on the underside 214 of the pallet 210. Preferably, the ribs 215 do not extend across the deck 212, and the ribs 215 are in a series of five ribs in the lateral direction, and approximately twenty-seven ribs in the longitudinal direction with a wider middle rib 215A in the center of the pallet 210. The channels 217 preferably intersect at a rounded vertex on each corner of a rib 215. Middle rib 215A preferably contacts the underside 214 (shown as a center structure in a leg), and ideally has at least one dimple 219 that contacts the underside 214 to give additional support to the pallet deck 212. FIG. 15 and FIG. 19 both show a cross sectional view through the center of the ribbed pallet, wherein the dimple 219 is in contact with concave arched bottom recess 270 of the center leg 250. Similarly, FIG. 20 shows a dimple 219 in contact with concave arched bottom recess 221 of a center lateral side leg 223.

FIG. 18 shows the underside 214 of a pallet 210 with nine legs 223, 225, 227, 229, 231, 233, 235, 237 and 250. The center leg 250 is between two center lateral side legs 223 and 225, and is between two center longitudinal side legs 227 and 229. Also, there are four corner legs, 231, 233, 235, and 237. The nine legs show the versatility of the recess and depressions and how their functions can be combined. The floral kiss-off structure 298 of legs 227, 229 and 250 are inwardly inclined star kiss-off structures with V-shaped rounded vertex adjacent each corner of the rectangular leg. All of legs 223, 225, 227, 229 and 250 include floral kiss off structures 298 in the center of each leg, but these structures also include a substantially V-shaped rounded vertex adjacent the inner surface of a side wall of each leg. As shown, the floral kiss off structures 298 preferably comprises at least ten percent of the area of the bottom of the leg, and are shown equaling approximately fifty percent. Similarly, the corner legs, 231, 233, 235, and 237 include depressions with substantially V-shaped rounded vertex adjacent the inner surface of each side wall of each leg, and provide a inwardly inclined recess shown as a dome to provide support to the deck 212 similar to the kiss off depressions. The four-sided depressions with substantially V-shaped rounded vertexes of the corner legs, 231, 233, 235, and 237 form diamond shapes having a rounded vertex adjacent the inner surface of the side wall of the leg. In a rectangular pallet, the diamond-shaped structures are in the legs so that there are four diamond-shaped structures, one in each corner of the pallet. As shown, the diamond depressions preferably comprise at least ten percent of the area of the bottom of the leg, and are shown equaling approximately fifty percent.

Also, FIG. 18 shows the option of possible metal reinforcement bars. Metal bar cavities 204 and 205 could have kiss-off depressions 206 to simultaneously give the cavities 204 and 205 strength and would help add support to the deck 212 when a load is applied on deck 212.

FIG. 16 shows a cross sectional view through a channel 217 including a clamp locator 313 of the ribbed pallet 210 along section 6-6 of FIG. 13. Clamps and end pins can be used to secure metal bars.

Finally, a pallet 210 can optionally have removable inserts 369 when a tool that will remove the wide outer ribs completely to allow for machine clearance on presses that were not designed for the full 104 cm format. FIG. 17 shows a detail of an optional insertable metal bar 369, which is preferably steel, between the deck wall 212 and the underside 214.

Rotational molding is the preferred method of manufacturing one-piece, hollow, continuous wall, strong, durable, lightweight pallets. It also is well adapted for uniform wall thicknesses with no problematic thinning in the extremities of the pallet. Further, it allows for a pallet that is resistant to stress-cracking and corrosion. Rotational molding provides excellent load-bearing properties with minimal stressed areas. Rotational molding also allows for metal inserts as integral parts. With rotational molding, complex and varied shapes can be formed to make hollow, lightweight pallets.

Using unique mold construction to accommodate the pallet features described above, the process of rotational molding uses heat to melt and fuse plastic resin in a closed hollow mold. Rotational molding is compatible for use with complex molds with such structural features.

An initial step includes loading a plastic material or resin in a hollow mold that will be closed. The plastic resin can be either a liquid or powder. The next step is heating and fusing the resin. Time and temperature of heating will depend on the plastic used, wall thickness of the finished product, and type of mold used. As an example, polyethylene can be heated to 550 degrees F. to 650 degrees F. for 10 to 25 minutes. After or while the charged mold is heated, the mold is continuously rotated on two axes at low speed. As heat penetrates the mold, resin adheres to the entire inside surface (all inner surfaces) of the mold until completely fused. The mold is heated to the fusion temperature while continuing to rotate allowing a thin layer of plastic material to deposit from the heated liquid plastic pool. Next, the molded resin is cooled. Cooling is preferably gradual while the mold is still rotating. It may be air or water cooled, preferably with a spray or a mist. The cooled finished product solidifies, regaining strength and retaining the shape of the mold. Finally, the finished product, a pallet, is removed from the opened mold.

Although the preferred embodiment of the invention is illustrated and described in connection with a particular type of pallet, it can be adapted for use with a variety of pallets. Other embodiments and equivalent pallets, structural depressions, and methods are envisioned within the scope of the invention. Various features of the invention have been particularly shown and described in connection with the illustrated embodiment of the invention; however, it must be understood that these particular embodiments merely illustrate and that the invention is to be given its fullest interpretation within the terms of the appended claims.

What is claimed is:

1. A hollow pallet comprising a unified deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg, wherein the deck wall is integral with the rest of the pallet.

2. A hollow pallet comprising a deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg wherein the leg having the structure has a side wall and the structure also includes a substantially V-shaped rounded vertex adjacent an inner surface of the side wall of the leg that has the structure to provide side impact resistance.

3. The pallet of claim 2 wherein the plurality of legs includes a set of three outer legs along each opposing side of the pallet and three middle legs between the two sets of three outer legs with a diamond kiss-off depression in at least four of the six outer legs, and a floral kiss-off structure in each of the three middle legs.

4. The pallet of claim 3 further comprising nubbins that rise above the deck wall above the outer legs.

5. The pallet of claim 4 further comprising corresponding recesses in the outer legs of the pallet adapted to receive nubbins of another pallet.

6. A hollow pallet comprising a deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg wherein the inwardly inclined structure is a diamond kiss-off depression.

7. A hollow pallet comprising a deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg wherein the inwardly inclined structure is a floral kiss-off structure.

8. The pallet of claim 7 wherein the inwardly inclined structure is a star kiss-off structure.

9. The pallet of claim 7 wherein the portion that contacts the deck wall is a series of concave kiss-off structures that extend toward and are in contact with the deck wall.

10. The pallet of claim 7 wherein the deck wall includes ribbing.

11. The pallet of claim 10 wherein the deck wall includes a dual entry rib configuration having a plurality of ribs.

12. The pallet of claim 11 wherein at least one of the plurality of ribs includes a dimple in contact with the underside.

13. A hollow pallet comprising a deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg wherein the structure includes a kiss-off depression as the portion that contacts the deck wall.

14. The pallet of claim 13 wherein the structure is free of right angles, sharp edges, and corners.

15. A hollow pallet comprising a deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg wherein the pallet is formed of a unitary, one-piece, continuous wall of plastic.

16. The pallet of claim 15 having a uniform wall thickness.

17. The pallet of claim 15 further comprising partially planar wall sections on the underside between the plurality of legs including cavities adapted to accommodate reinforcement bars.

18. A hollow pallet comprising a unified deck wall, an underside supporting the deck wall, the underside including a plurality of legs, at least one leg of the plurality of legs having an inwardly inclined structure having a portion that contacts the deck wall to provide support, the structure forming a section of a wall of at least one leg having the structure and includes at least ten percent of the area of the bottom of the leg further comprising a metal bar inserted between the deck wall and the underside.

19. A continuous surface, hollow pallet having a deck wall and a plurality of legs beneath the deck wall, including four corner legs each having a wall with an inner and an outer surface, the four corner legs including at least two side walls, each corner leg having a structure with a substantially V-shaped rounded vertex adjacent the inner surface of each side wall of each corner leg.

20. A continuous surface, hollow pallet having a deck wall and a plurality of legs beneath the deck wall, each having a wall with an inner and an outer surface, at least one of the plurality of legs including a side wall and a structure with a substantially V-shaped rounded vertex adjacent the inner surface of the side wall of the leg having the structure wherein the structure is a substantially diamond-shaped structure in at least one of the plurality of legs, the structure having a rounded vertex adjacent the inner surface of at least two side walls of the leg with the structure.

21. The pallet of claim 20 wherein the pallet is rectangular, the pallet having diamond-shaped structures in at least two legs so that there are four diamond-shaped structures, one in each corner of the rectangular pallet.

22. The pallet of claim 20 having a uniform wall thickness.

23. The pallet of claim 20 wherein the deck wall includes ribbing.

24. The pallet of claim 23 wherein the deck wall includes a dual entry rib configuration having a plurality of ribs.

25. A plastic one-piece, hollow, continuous wall pallet, the pallet comprising a substantially flat deck wall with ribbing having ribs and channels, a plurality of legs, and partially planar wall sections between the legs on an underside of the pallet, wherein a portion of the underside is in contact with the channels of the ribbing to provide support, wherein the deck wall has a dual entry rib configuration, the channels extend completely across the deck wall in both the lateral and longitudinal directions, and wherein the ribs do not extend across the deck wall in either the lateral or longitudinal directions, and each rib has a channel on at least two sides intersecting at a rounded vertex.

26. The pallet of claim 25 wherein the portion of the underside in contact with the channels is one of the partially planar wall sections.

27. The pallet of claim 25 wherein the portion of the underside in contact with the channels is a structure in one of the plurality of legs.

28. A plastic one-piece, hollow, continuous wall pallet, the pallet comprising a substantially flat deck wall with ribbing having ribs and channels, a plurality of legs, and partially planar wall sections between the legs on an underside of the pallet, wherein a portion of the underside is in contact with the channels of the ribbing to provide supports, wherein the ribs do not extend across the deck and each rib has a channel on at least two sides, wherein the channels extend completely across the deck in both lateral and longitudinal directions.

29. The pallet of 28 wherein at least three sets of ribs are aligned in the lateral and longitudinal directions across the pallet.

30. The pallet of claim 28 further comprising cavities in the partially planar wall sections adapted to accommodate reinforcement bars.

31. The pallet of claim 28 further comprising a bar inserted between the deck wall and at least one of the partially planar wall sections.

32. A deck of a pallet having dual entry rib configuration with ribbing having ribs and channels, the channels extend completely across the deck in both the lateral and longitudinal directions, and wherein the ribs do not extend across the deck in either the lateral or longitudinal directions, and each rib has a channel on at least two sides intersecting at a rounded vertex.

33. The pallet of claim 32 wherein at least five sets of ribs are aligned in the lateral direction across the pallet and at least five sets of ribs are aligned in the longitudinal direction across the pallet.

* * * * *

UNITED STATES PATENT AND TRADEMARK OFFICE
CERTIFICATE OF CORRECTION

PATENT NO.    : 6,807,911 B2
DATED         : October 26, 2004
INVENTOR(S)   : Craig Carson, Mark Bendit and Steven Turley It is certified that error appears in the above-identified patent and that said Letters Patent is hereby corrected as shown below:

Column 13,
Line 6, the word "supports" should read -- support --.

Signed and Sealed this

Eighth Day of March, 2005

JON W. DUDAS
*Director of the United States Patent and Trademark Office*